US010732074B1

(12) United States Patent
Beckman et al.

(10) Patent No.: US 10,732,074 B1
(45) Date of Patent: Aug. 4, 2020

(54) MULTI-FACETED TEST CHAMBER

(71) Applicant: Amazon Technologies, Inc., Seattle, WA (US)

(72) Inventors: Brian C. Beckman, Newcastle, WA (US); Avi Bar-Zeev, Oakland, CA (US); Steven Gregory Dunn, Bothell, WA (US); Amir Navot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 15/829,739

(22) Filed: Dec. 1, 2017

Related U.S. Application Data

(62) Division of application No. 14/579,344, filed on Dec. 22, 2014, now Pat. No. 9,863,840.

(51) Int. Cl.
*G01M 9/04* (2006.01)

(52) U.S. Cl.
CPC ..................... *G01M 9/04* (2013.01)

(58) Field of Classification Search
None
See application file for complete search history.

(56) References Cited

U.S. PATENT DOCUMENTS

| 3,620,076 A | 11/1971 | Heyson |
| 5,942,682 A | 8/1999 | Ghetzler et al. |
| 7,156,744 B2 | 1/2007 | Metni et al. |
| 2006/0025227 A1* | 2/2006 | Metni ..................... A63G 31/00 472/137 |
| 2011/0100109 A1* | 5/2011 | Kim ........................ G01M 9/02 73/147 |

OTHER PUBLICATIONS

Office action for U.S. Appl. No. 14/579,344, dated Nov. 2, 2016, Beckman et al., "Multi-Faceted Test Chamber", 9 pages.
Office action for U.S. Appl. No. 14/579,344, dated Apr. 21, 2017, Beckman et al., "Multi-Faceted Test Chamber", 9 pages.

* cited by examiner

Primary Examiner — Paul M. West
Assistant Examiner — Mark A Shabman
(74) Attorney, Agent, or Firm — Lee & Hayes, P.C.

(57) ABSTRACT

Systems and methods for providing a multi-direction wind tunnel, or "windball," are disclosed. The system can have a series of fans configured to provide air flow in a plurality of directions to enable accurate testing of aircraft, unmanned aerial vehicles (UAVs), and other vehicles capable of multi-dimensional flight. The system can comprise a spherical or polyhedral test chamber with a plurality of fans. The fans can be arranged in pairs, such that a first fan comprises an intake fan and a second fan comprises an exhaust fan. The direction of the air flow can be controlled by activating one or more pairs of fans, each pair of fan creating a portion of the air flow in a particular direction. The direction of the air flow can also be controlled by rotating one or more pairs of fans with respect to the test chamber on a gimbal device, or similar.

20 Claims, 8 Drawing Sheets

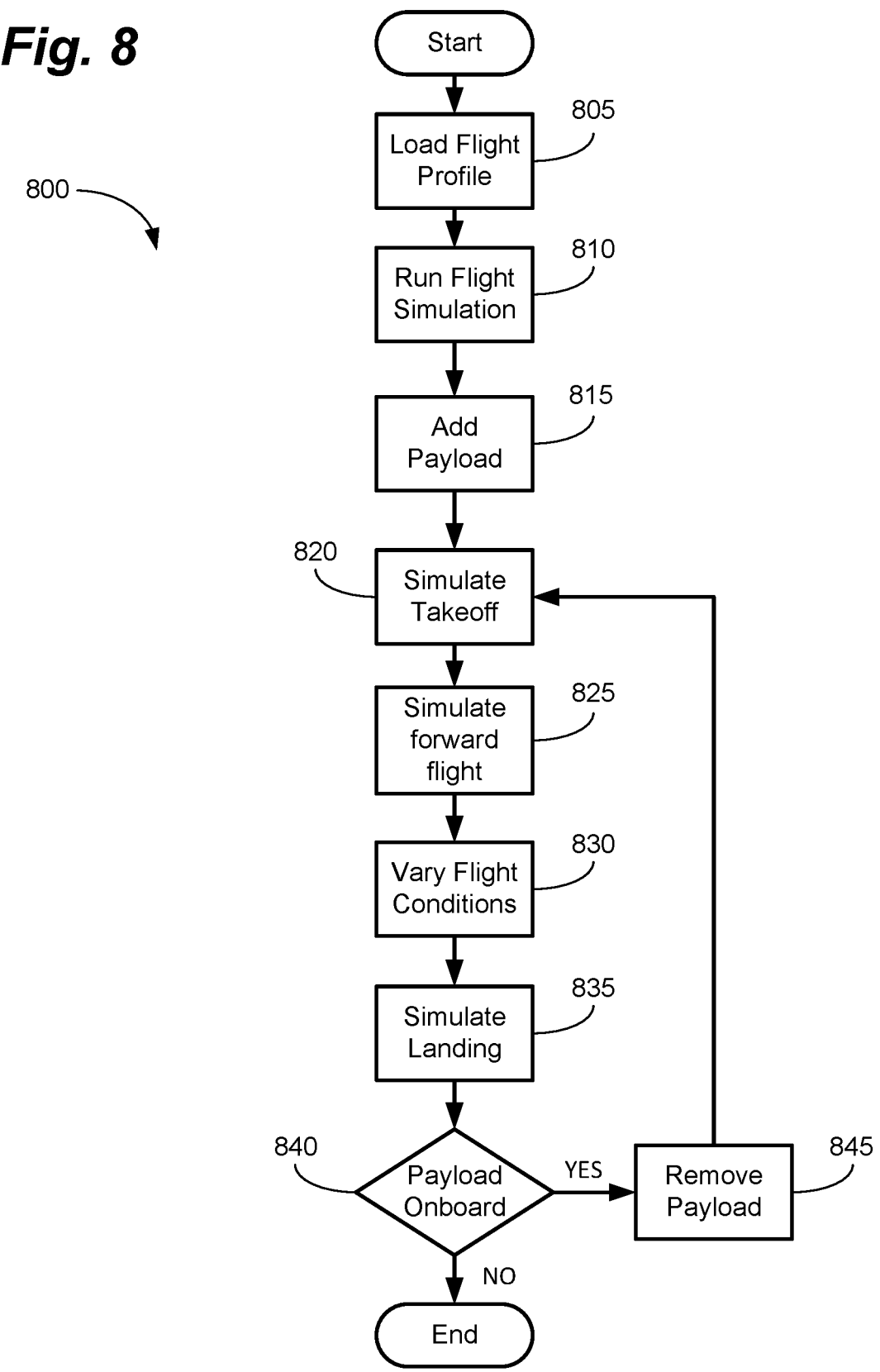

MULTI-FACETED TEST CHAMBER

CROSS-REFERENCED APPLICATION

This application is a divisional of U.S. patent application Ser. No. 14/579,344, entitled "Multi-Faceted Test Chamber", filed on Dec. 22, 2014, the entirety of which is incorporated herein by reference.

BACKGROUND

Unmanned aerial vehicles (UAVs) comprise a variety of vehicles, from conventional fixed wing airplanes, to helicopters, to ornithopters (i.e., machines that fly like birds), and are used in a variety of roles. They can be remotely piloted by a pilot on the ground or can be autonomous or semi-autonomous vehicles that fly missions using preprogrammed coordinates, GPS navigation, etc. UAVs can include remote control helicopters and airplanes for the hobbyist, for example.

UAVs can be equipped with cameras to provide imagery during flight, which may be used for navigational or other purposes, e.g., identify a house address, etc. UAVs can also be equipped with sensors to provide local weather and atmospheric conditions, radiation levels, and other conditions. Depending on the type, UAVs can also use conventional fixed wing flight (e.g., remote control planes) or can include vertical takeoff and landing (VTOL) capabilities (e.g., helicopters and other rotorcraft).

Unfortunately, conventional wind tunnels provide air flow in only one direction. Thus, for rotorcraft and other UAVs capable of VTOL and multi-dimensional flight, the conventional wind tunnel provides limited test data. The ability to test UAVs in multi-dimensional flight in wind tunnels can reduce costs and development time and improve UAV flight controls, avionics, and navigation, among other things.

BRIEF SUMMARY OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 depicts a method for simulating flights, or flight segments, using a multi-dimensional wind tunnel, in accordance with some examples of the present disclosure.

DETAILED DESCRIPTION

Examples of the present disclosure relate generally to testing apparatuses for unmanned aerial vehicles ("UAVs") and specifically to a multi-dimensional wind tunnel, or "windball" for testing the flight dynamics of UAVs. The windball can incorporate a number of features to provide air flow in multiple directions to enable the testing of UAVs in multiple flight regimes and conditions. In some examples, the windball may comprise a plurality of pairs of fans, each pair of fans with an input fan and an output fan. In other examples, the windball may comprise a spherical or polyhedral chamber disposed inside a wind chamber with a plurality of flow control doors. In still other examples, the windball can comprise an intake fan and an exhaust fan mounted on a gimbaling system, or similar apparatus, to enable the air flow direction to be changed with respect to a model disposed inside the wind ball.

To simplify and clarify explanation, the disclosure is described herein as a system and method for testing UAVs and UAV related systems. One skilled in the art will recognize, however, that the disclosure is not so limited. The system is described as a system for testing UAVs, for example, but could just as easily be used to test other types of vehicles including, but not limited to, helicopters, hovercraft, automobiles, and motorcycles. In addition, while shown in cubic and icosahedral forms, the windball can take other polyhedral shapes depending on the complexity of flows desired and budgetary and space requirements, among other things. Similarly, the term "fan," as used herein, is intended to include many types of fans and air flow generators, including, for example and not limitation, standard bladed fans, squirrel cage fans, pressurized air sources, nozzles, and electrostatic fluid accelerators.

The vehicles, methods, and systems described hereinafter as making up the various elements of the present disclosure are intended to be illustrative and not restrictive. Many suitable physical plants, air sources, and mechanisms that would perform the same or a similar function as the systems described herein are intended to be embraced within the scope of the disclosure. Such other systems and methods not described herein can include, but are not limited to, fans, compressors, control systems, networks, and technologies that are developed after the time of the development of the disclosure.

Figure 1:
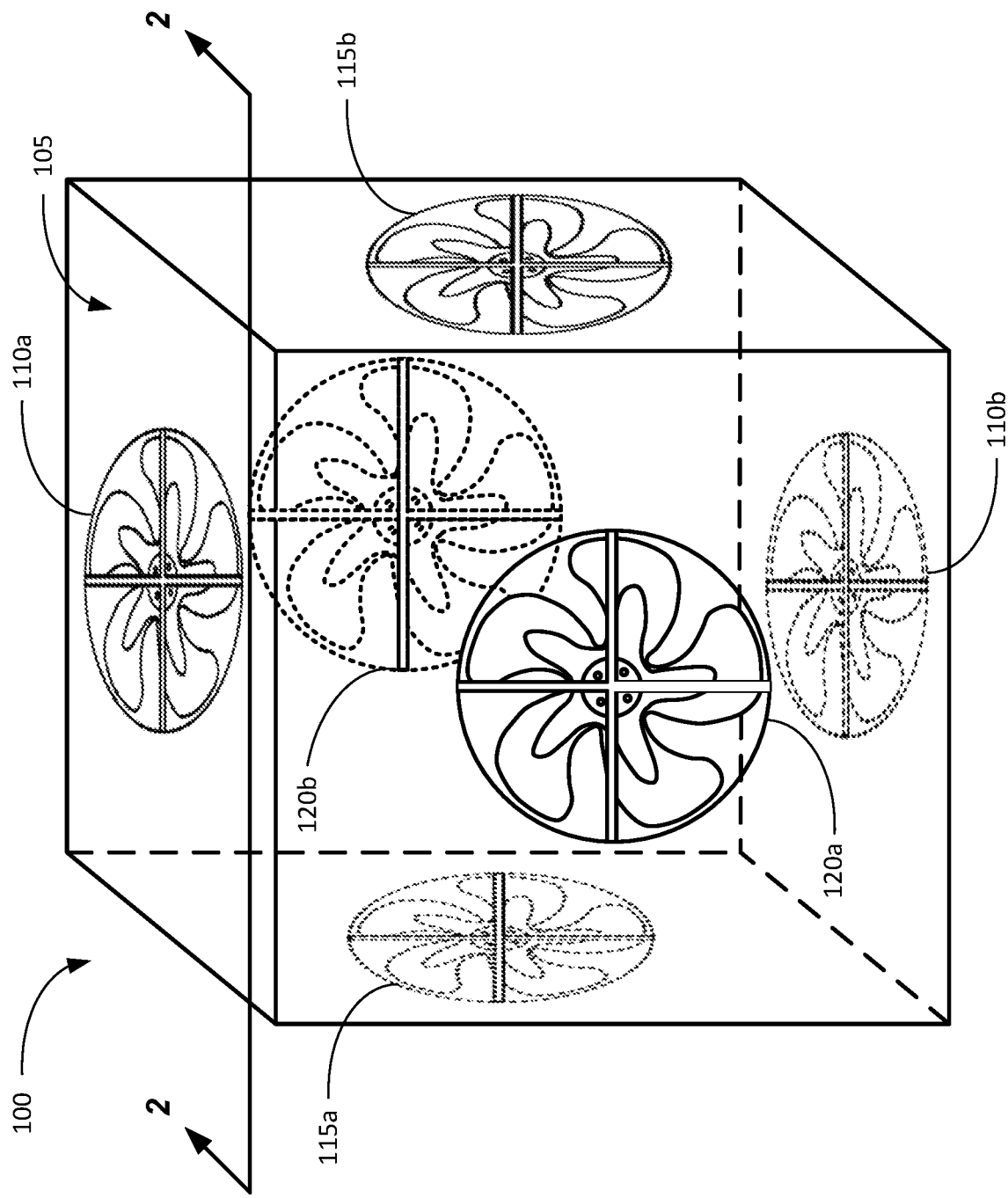
FIG. 1 depicts a cubic multi-dimensional wind-tunnel, in accordance with some examples of the present disclosure.

Examples of the present disclosure can comprise a system 100 for providing a windball. As shown in FIG. 1 (and in section view in FIG. 2), in some examples, the system 100 can comprise a cube with three pairs of fans 110, 115, 120 to provide air flow along the six degrees of freedom of flight (e.g., up, down, right, left, forward, and backward). To this end, the system 100 can comprise a vertical fan pair 110, a longitudinal fan pair 115, and a transverse fan pair 120 to provide up/down, forward/backward, and left/right air flows, respectively.

In some examples, each pair of fans can comprise an intake fan and an exhaust fan. So, when creating a downdraft, for example, the vertical fan pair 110 can comprise an intake fan 110a and an exhaust fan 110b. Of course, this designation is somewhat arbitrary as each fan 110 can act as an intake fan 110a and an exhaust fan 110b simply by reversing its direction of rotation. Regardless of designation, each pair of fans 110, 115, 120 can rotate in the "same"

direction to produce flow in the same direction, i.e., such that each pair of fans 110 is acting in concert to create an air flow in a single direction. In some examples, this may actually equate to the intake 110a and exhaust fans 110b turning in opposite directions because they are mounted in opposition. As a result, for the vertical fan pair 110, running both fans in a first direction can create a downward air flow, simulating a downdraft, for example; while running both fans in an opposite, second direction can create a upward air flow, simulating an updraft.

In some examples, the system 100 can also simulate blended flows. In other words, the system 100 can activate two or more fan pairs 110, 115, 120 to create flows that are not orthogonal to the model 125. So, for example, the vertical fan pair 110 can be activated to generate a downward flow, while the longitudinal fan pair 115 can be activated to generate a forward flow. In this manner, forward flight in which the UAV is experiencing a downdraft can be simulated. Similarly, the transverse fan pair 120 can be activated instead of the vertical fan pair 110, for example, to simulate forward flight with a cross wind.

Unlike simply mounting the model 125 on a rotating frame inside a conventional wind tunnel to simulate different air flow directions, however, the windball 100 can enable a UAV, or other vehicle model 125, to be subjected to air flows from multiple directions while still being oriented properly with respect to gravity. In other words, because the model 125 can be fixed with respect to the earth, while the air flow is changed around it, gravity, angle of attack, lift, and other data points can be properly simulated and tested. In contrast, rotating the model 125 within a fixed flow disassociates lift forces from gravity, for example, because rotating the model 125 changes the direction of the lift vector, while gravity remains downward. This disassociation results in accurate data and can lead to complex and inaccurate coordinate transformations, for example.

Figure 2:
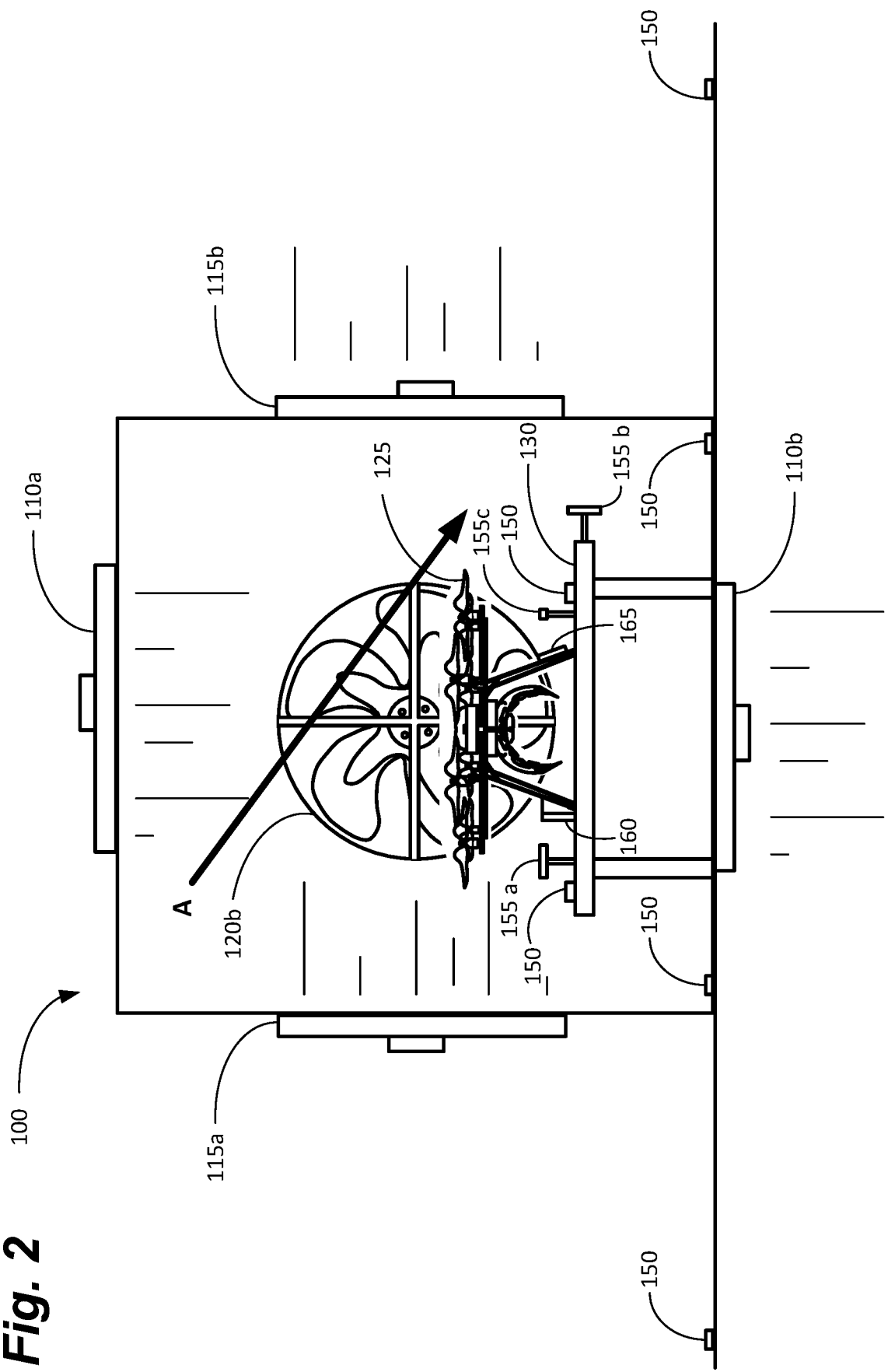
FIG. 2 depicts a section view of the cubic multi-dimensional wind-tunnel of FIG. 1, in accordance with some examples of the present disclosure.

FIG. 2 depicts a side section view of the windball 100 with the front face and front fan 120a removed. As shown, each pair of fans 110, 115, 120 can work in concert to create an air flow in a particular direction. In this configuration, the vertical fans 110 are generating a downward flow, with the top fan 110a acting as an intake fan and the bottom fan 110b acting as an exhaust fan. Similarly, the longitudinal fans 110 are creating a forward flow (with respect to the model), with the left fan 115a acting as an intake fan and the right fan 115b acting as an exhaust fan. In this manner, an off-axis air flow, Arrow A, can be generated simulating forward flight with a downdraft.

Of course, each pair of fans can create a flow in two directions, providing all six degrees of freedom and combinations thereof. In other words, a single pair of fans 110 can be run to generate on-axis (vertical, longitudinal, and transverse) flows, while multiple pairs of fans can be run to generate off-axis, or tilted, flows. In some examples, one or more pair of fans 110 may also be run in opposite directions to simulate turbulence, for example.

In some examples, the support 205 for the model 125 can also comprise one or more testing instruments such as, for example, pressure sensors 150, velocity sensors 155, and/or strain gauges 160 to collect flight data. The system 100 can include a plurality of pressure sensors 150 both inside and outside the test chamber 105. The system 100 can also comprise a plurality of pressure sensors 150 I different locations inside the test chamber 105 to, for example, measure pressure upstream and downstream of the model 125.

In some examples, the system 100 can also comprise a plurality of velocity sensors 155. In some examples, the plurality of velocity sensors 155 can comprise a longitudinal velocity sensor 155a for measuring forward and aft air flow, a vertical velocity sensor 155b for measuring up and down air flow, and a transverse velocity sensor 155c for measuring cross wind type flow. Of course, in some examples, the data from the three velocity sensors 155 can be resolved to generate a velocity vector with a velocity and a direction. In some examples, all three velocity sensors 155 can be combined in a single multi-axis sensor.

In still other examples, the system 100 can further comprise one or more strain gauges. In some examples, the system 100 can include one or more strain gauges 160 connected to the model 125 and the support 130. This can enable the system 100 to measure, for example, lift, side force, and longitudinal force. In other examples, the system 100 can also comprise strain gauges 165 mounted solely to the model 125. This can enable the system 100 to measure bending and flexing forces on the model 125 due to, for example, aerodynamic forces from the air flow in the chamber 105.

Figure 3:
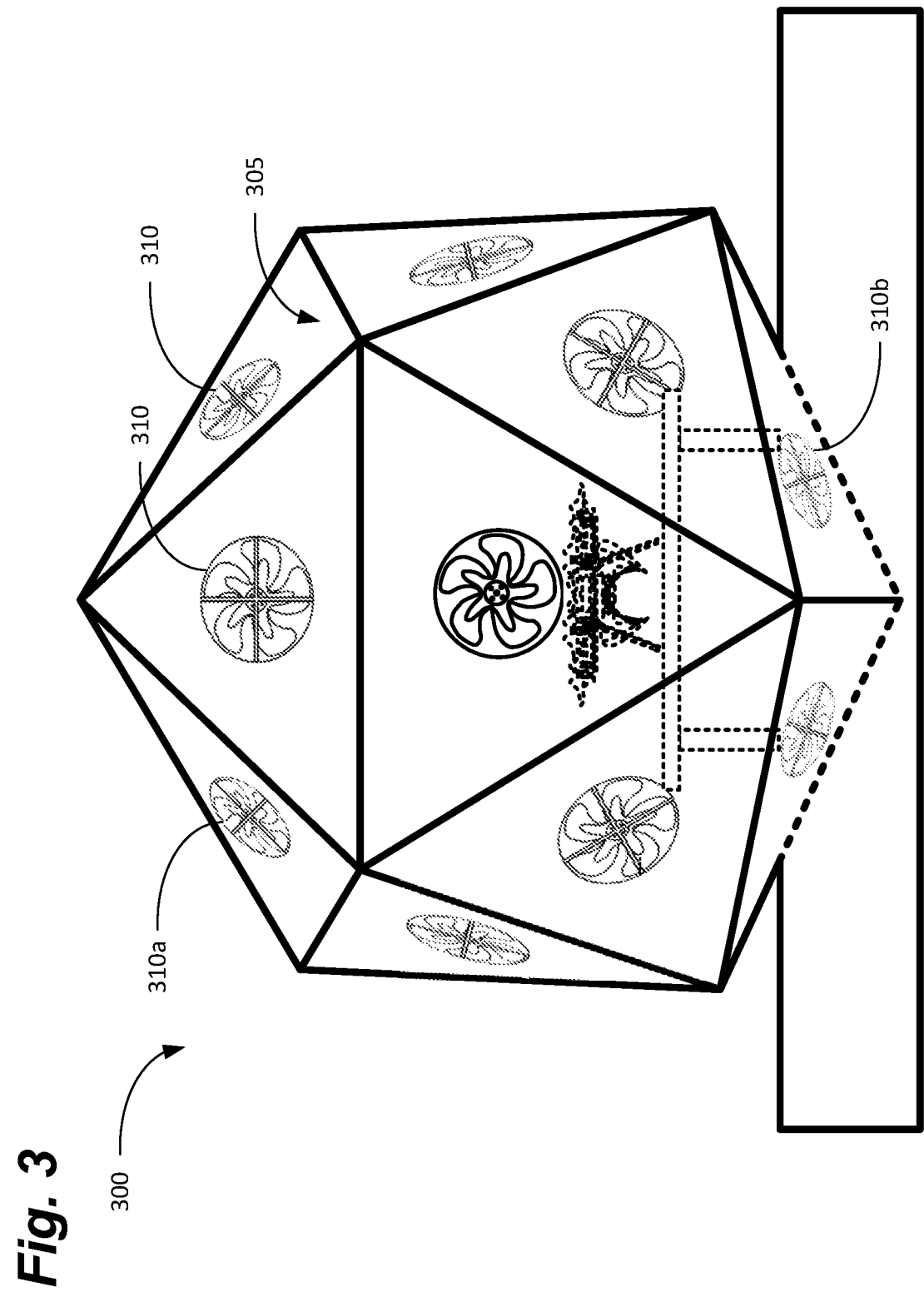
FIG. 3 depicts an icosahedral multi-dimensional wind-tunnel, in accordance with some examples of the present disclosure.

As shown in FIG. 3, in some examples, the windball 300 can comprise a spherical or polyhedral chamber 305 (in this case an icosahedron) surrounded with a plurality of fans 310 working in pairs. As before, in some examples, each pair of fans 310 can comprise an intake fan 310a and an exhaust fan 310b. In this manner, each pair of fans 310 can generate an air flow across the chamber 305 in a particular direction. As before, in some tests, multiple fan pairs 310 can be activated to create multi-component flows, vortices, cross winds, turbulence, updrafts, downdrafts, and other flight regimes.

The number of fan pairs 310 can be varied according to a particular application or test facility. Increasing the number of fan pairs 310, for example, can provide an increased number fans and this, air flow combinations, for example, but can result in extra expense and complexity. As the number of fan pairs 310 and chamber facets 315 increase, the chamber 305 can approach a spherical shape with a huge number of air flow combinations. A fewer number of fan pairs 310 (as in FIGS. 1 and 2), on the other hand, may provide a limited number of air flow combinations, but can be assembled at lower cost and utilize simpler control systems, among other things.

Figure 4:
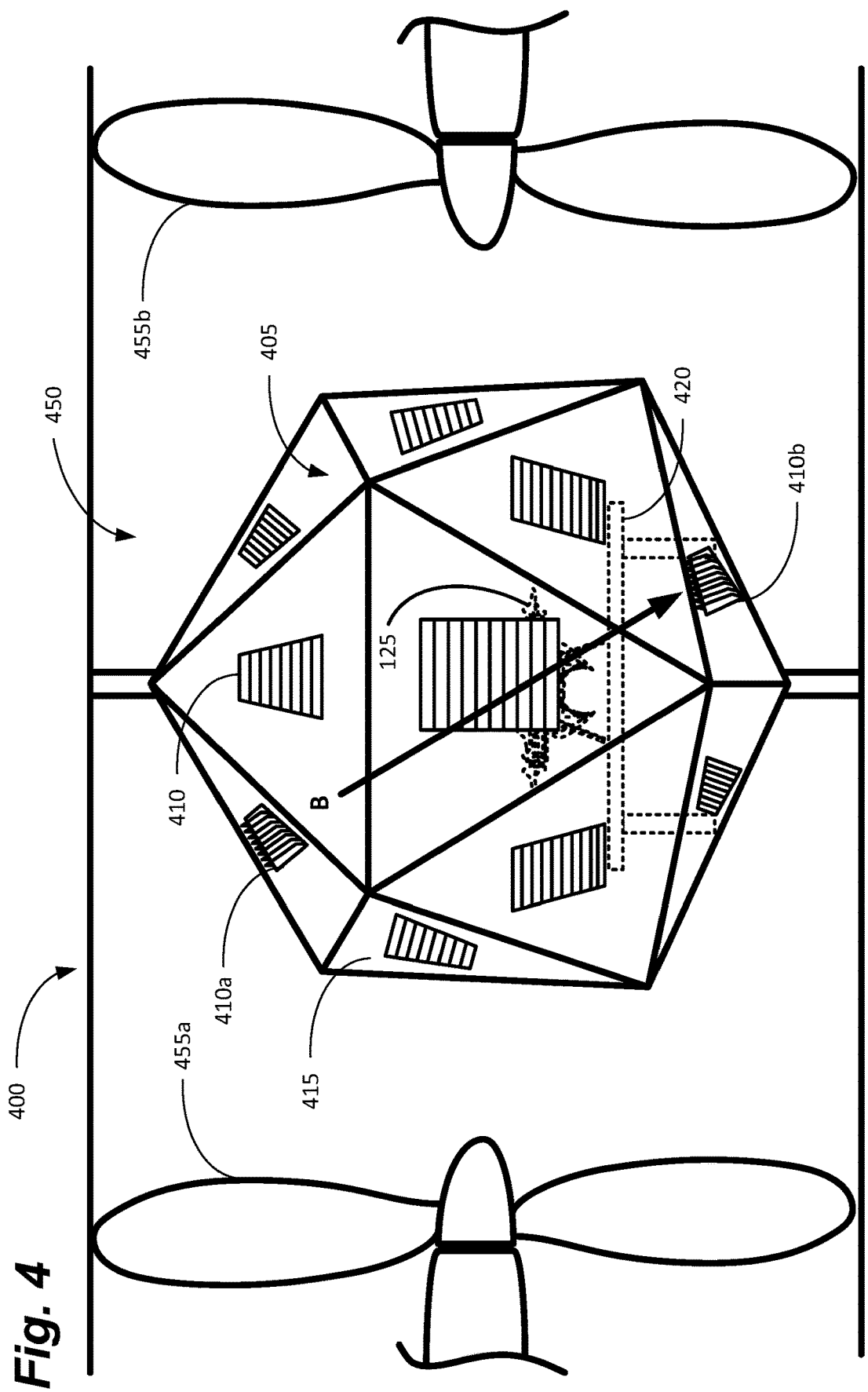
FIG. 4 depicts an icosahedral chamber with multiple flow control doors disposed in a conventional uni- or bi-directional wind tunnel, in accordance with some examples of the present disclosure.

As shown in FIG. 4, in some examples, the system 400 can comprise a spherical or polyhedral chamber 405 including a plurality of flow control doors 410. In this configuration, the system 400 can be provided with an external air flow source, such as a conventional wind tunnel 450, and can control air flow within a test chamber 405 with the flow control doors 410. In some examples, the flow control doors 410 can comprise louvers, as shown. In other examples, the flow control doors 410 can comprise, for example and not limitation, gate valves, butterfly valves, ball valves, shutters (similar to a camera shutter), rollup doors, hinged doors (or pairs of doors), and sliding doors.

Regardless of the design, the flow control doors 410 can have an open position and a closed position. In this configuration, air flow can be provided by one or more fans 455 in the wind tunnel 450. In some examples, the flow control doors 410 can comprise an inlet 410a and an outlet 410b, such that opposing doors 410a, 410b can be opened to enable air flow from one side of the chamber 405 to the other, represented by Arrow B. The fans 455 in the wind tunnel 450 can be run in a first direction to simulate forward flight and in a second direction to simulate backward flight.

Flow control doors 410c located on the sides of the chamber 405 can be opened and closed to simulate cross winds. Each pair of flow control doors 410 can provide air flow in a forward or backward direction based on the orientation of the facet 415 in which each flow control door 410 is mounted. As discussed below, a larger number of facets 415 represent a larger number of possible air flow directions, but increases complexity.

In some examples, the system 400 can be mounted in a conventional wind tunnel 450 comprising an air source such as a large fan 455 or turbine. In this manner, the generally laminar, unidirectional flow in the wind tunnel 450 can be redirected to enable additional flow testing, while enabling the model 125 to remain stationary. This can enable multi-directional flow testing on the model, while enabling the model 125 to remain correctly oriented with respect to the ground. Thus, lift readings taken from the model 125 (or a strain gauge connected to the support 420, for example, are correctly oriented with respect to gravity, as opposed to be tilted out of plane.

As with the fan-type windball 300 discussed above, the greater the number of flow control doors 410, the greater the number of air flow directions and combinations that can be created in the test chamber 405. Of course, more flow control doors 410 in the system 400 represents a more complex chamber 405 and control system, among other things. Thus, using a smaller number of flow control doors 410, reduces complexity, but also reduces the number of flow directions and combinations that can be generated. In some examples, in addition to the conventional fan 455a located at the front of the wind tunnel, the wind tunnel 450 can also comprise a second air source, or fan 455b, located at the rear of the wind tunnel 450. In this manner, air flow can be provided in both directions by reversing the fans 455.

Of course, in some examples, the system 400 could use a combination of reversible fans 310 and flow control doors 410. In other words, a fan 310 could be disposed on a first facet 415 of the chamber 405, while a flow control door 410 could be disposed on a second, opposing facet 415. In this manner, when the fan 310 is activated, the flow control door 410 can be opened to enable flow across the chamber 405. In addition, because the fan 310 is reversible, flow can be generated in either direction along the axis defined by the two facets 415. This can enable the system 400 to generate multi-directional flows, but may enable a reduction in cost and power consumption, among other things, because fewer fans are required.

Figure 5:
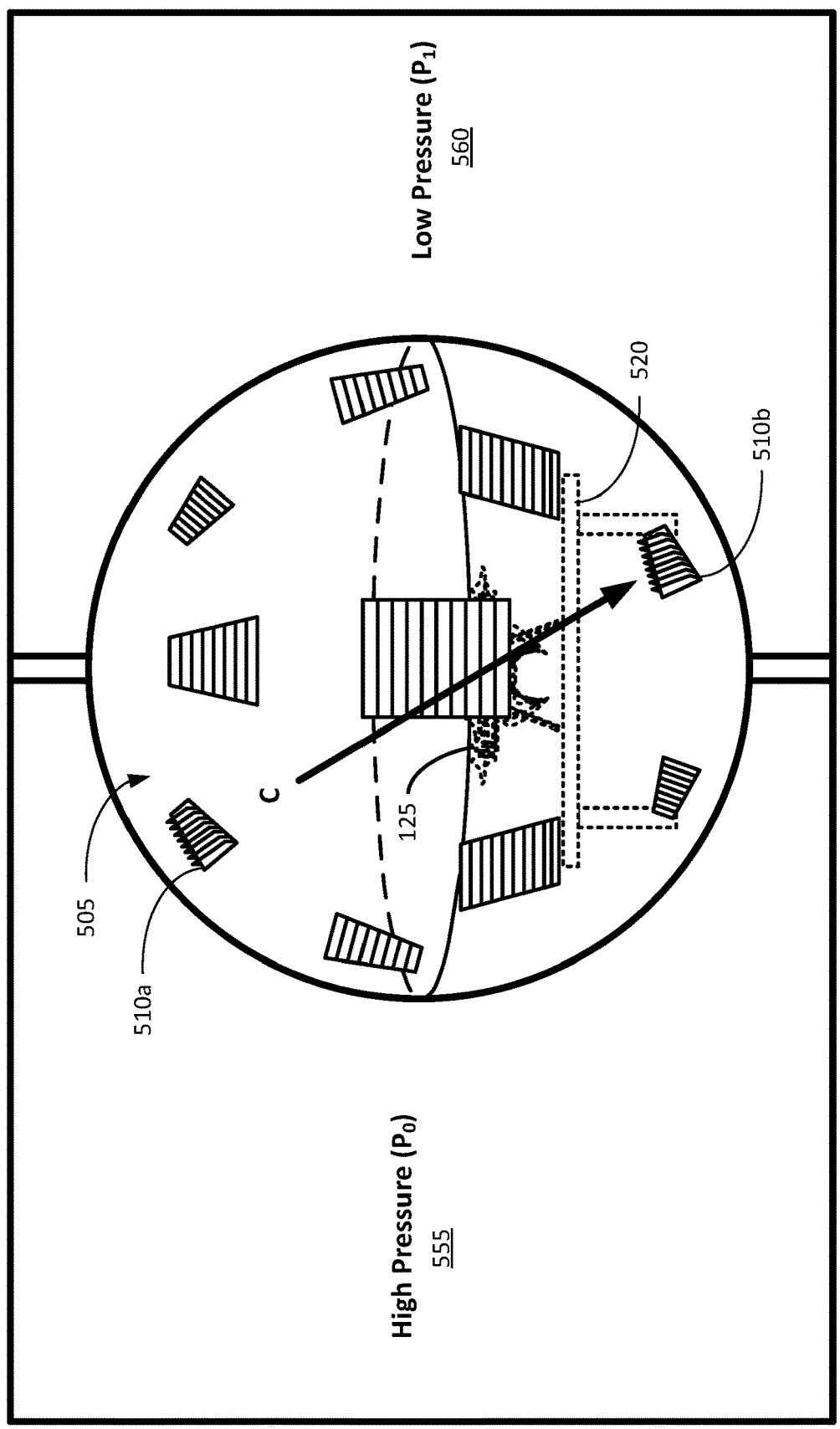
FIG. 5 depicts a spherical chamber with multiple flow control doors disposed in a differential pressure chamber, in accordance with some examples of the present disclosure.

In still other examples, as shown in FIG. 5, the system 500 can comprise a spherical or polyhedral chamber 505 including a plurality of flow control doors 510 mounted in a pressure chamber 550 with at least two pressure vessels 555, 560. In some examples, the two pressure vessels 555, 560 can comprise a high pressure vessel 555 and a low pressure vessel 560. In this manner, when one or more pairs of flow control doors 510 are opened, the pressure differential can cause air flow from high pressure ($P_0$) to low pressure ($P_1$), as shown by Arrow C. In addition, air flow can be reversed by simply reversing the pressure differential. In some examples, additional pressure chambers can be used to provide additional flow directions and combinations.

Figure 6:
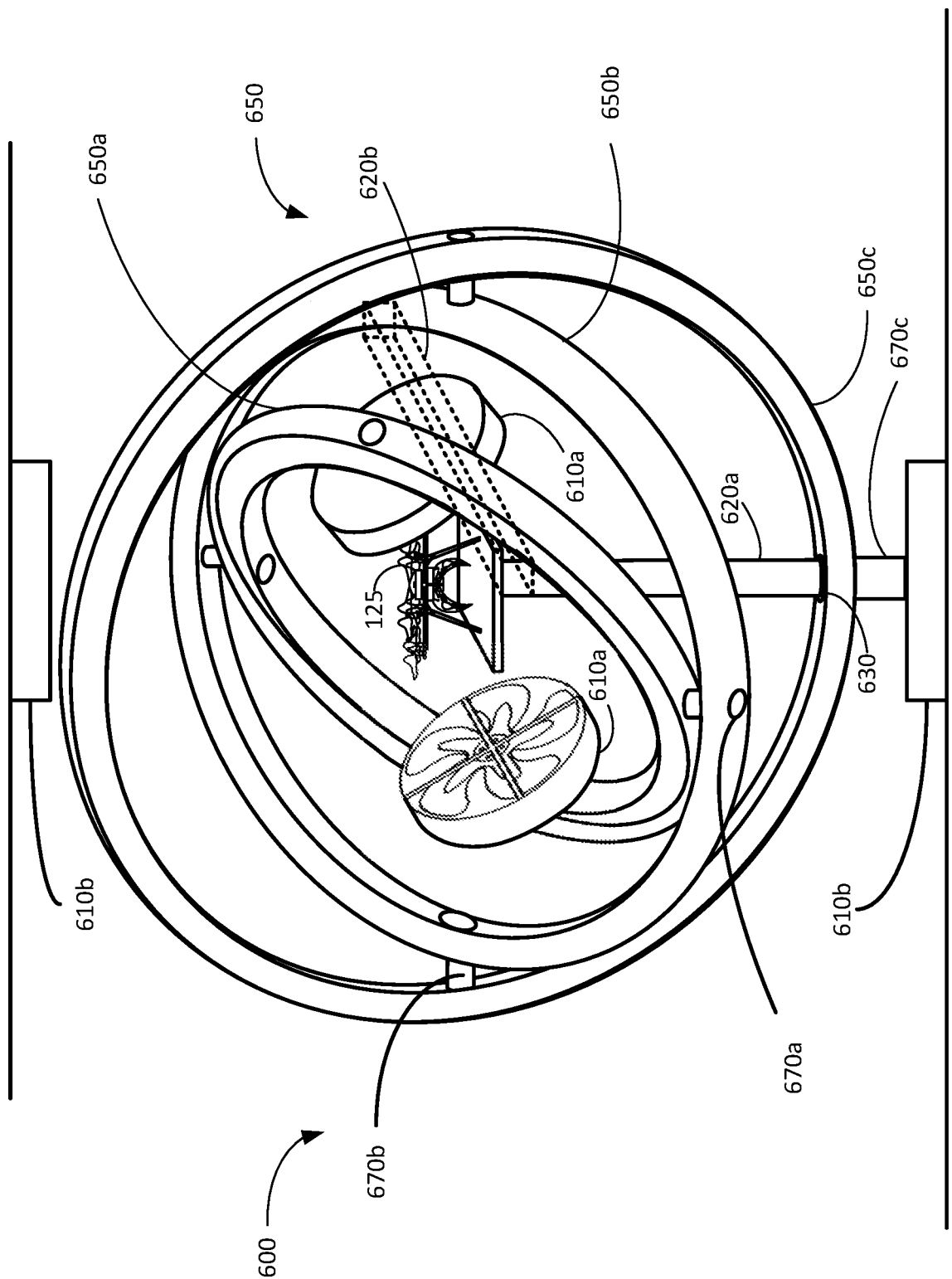
FIG. 6 depicts a multi-dimensional wind tunnel comprising a pair of fans mounted on a gimbaling system, in accordance with some examples of the present disclosure.

As shown in FIG. 6, in yet other examples, the model 125 can be mounted on a support such that it is suspended on a support 620 in the middle of a gimbaling fan system 600. In this configuration, a pair of fans 610 can be mounted on one or more gimbals 650 to enable a single pair of fans 610 to generate air flow in many directions. In some examples, the system 600 can comprise an inner gimbal 650a, an intermediate gimbal 650b, and an outer gimbal 650c. In this configuration, the fans 610 can be rotated independently of the model 125 to simulate air flow from many directions.

In some examples, the system 600 can comprise a plurality of gimbal motors 670 to move each gimbal 650 independently. In some examples, the plurality of gimbal motors 670 can comprise in inner gimbal motor 670a, an intermediate gimbal motor 670b, and an outer gimbal motor 670c. In some examples, the gimbal motors 670 can comprise stepper motors to enable the gimbals 650 to be precisely positioned.

In this configuration, the system 600 can provide a fairly self-contained apparatus. The system 600 can be used, for example, as a standalone testing apparatus. In other examples, the system can be more easily moved and/or setup (and torn down) in existing test facilities. This can enable the system 600 to be used inside existing unidirectional or bidirectional wind tunnels, acoustic chambers, and climactic hangers, for example, to facility multidiscipline testing.

Because the model 125 is still supported and, in some cases, instrumented, however, the movement of the gimbals 650 may be slightly limited by the support 620. In other words, the support 620, which can comprise, for example, an arm or pedestal connected to the wall (shown in dotted lines) or floor (shown in solid lines) of the test chamber, can interfere with the full movement of one or more of the gimbals 650. To address this issue, in some examples, the support 620 can be reconfigurable to enable it to move from the pedestal mount position 620a to the wall mount position 620b. In this manner, air flows that are precluded in one configuration can be tested, then the support 620 can be moved, and then any remaining air flows can be tested.

As mentioned above, when the support 620a is mounted on the intermediate gimbal support 630, the inner gimbal 635 cannot be rotated through a full 360 degrees because it will hit the support 620. Thus, while the fans 610a can generate a vast majority of air flow directions, they may not be able to generate a perfectly vertical airflow (though something very close can be achieved). As a result, in some examples, a supplementary set of fans 610b can be included to provide vertical flow.

In some examples, additional air flow control devices can be used to supplement the systems 100, 300, 500, 600 described above. In some examples, the system can also comprise Makita gates, for example, to generate gusts and other air flows in the chamber. The Makita gate consists of a plurality of vertical rods with diamond shapes attached at various twist angles (i.e., attached such that they are twisted around its vertical rod by a small angle). The Makita gate also comprises a plurality of horizontal rods, each with their own diamonds, similarly twisted at around the rod.

Each rod, horizontal or vertical, can be independently controlled and spins at some speed designed such that portions of the face formed by the rods open and close periodically to generate a variety of modes in the tunnel. The system can input a Fourier transform (e.g., in the regular and/or noise spectrum) and then generate the necessary rotation. Of course, other flow modifiers such as, for example, vortex generators, spoilers, wings, and fillets can be used to create additional flow patterns.

Figure 7:
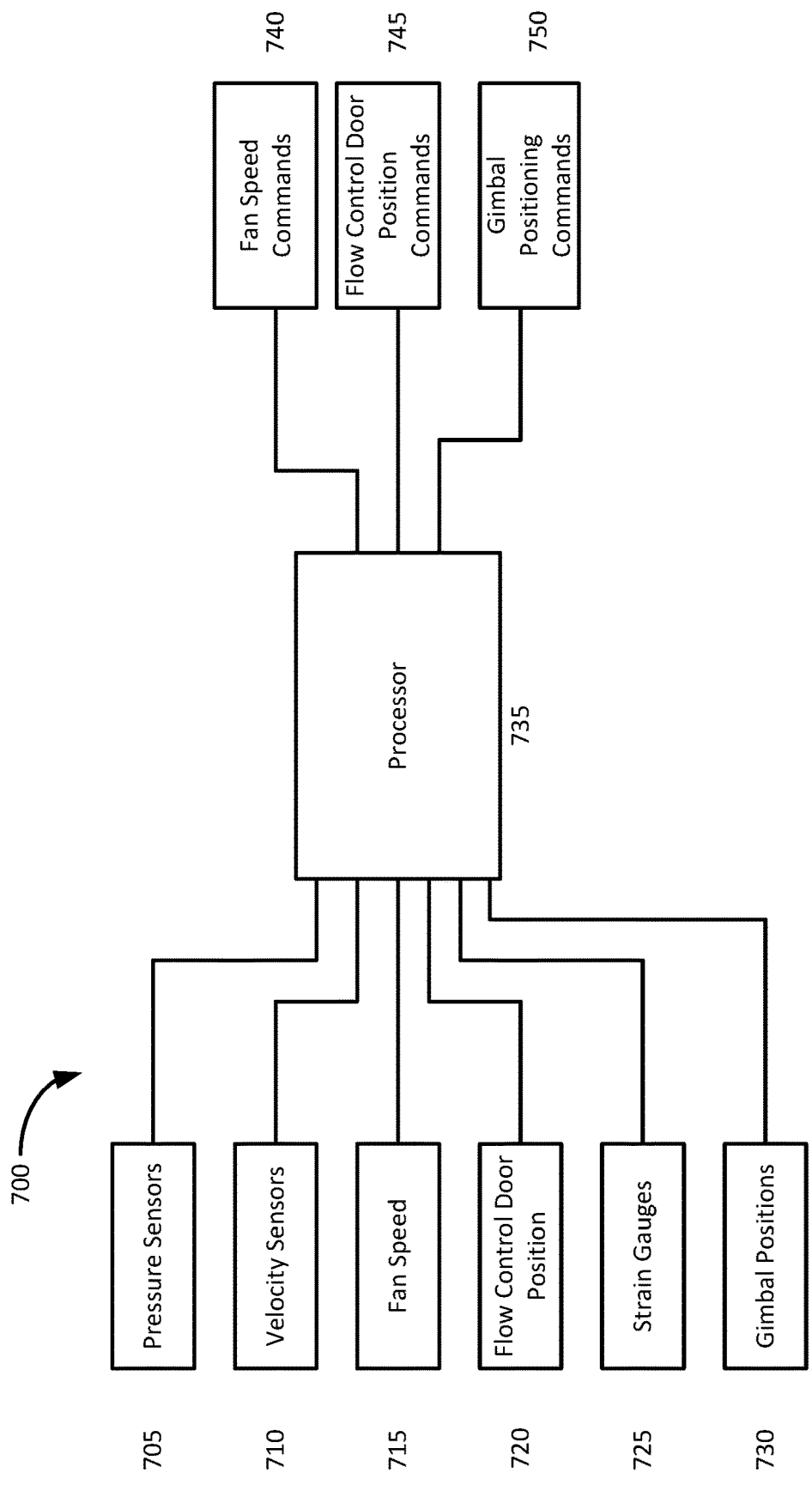
FIG. 7 depicts a control system for a multi-dimensional wind tunnel, in accordance with some examples of the present disclosure.

As shown in FIG. 7, examples of the present disclosure can also comprise a controller 700 for controlling any of the versions of the omnidirectional wind tunnel discussed above (e.g., fan based, pressure based, gimbal based, or combinations thereof). In some examples, the controller 700 can comprise a processor 735 for receiving a plurality of inputs and providing a plurality of outputs. The processor 735 can comprise, for example and not limitation, a server, a PC, a laptop, a tablet, an application specific integrated circuit (ASIC), or a field programmable gate array (FPGA).

In some examples, the controller 700 can also comprise a plurality of inputs. The controller 700 can comprise, for example, one or more pressure sensors 705. The pressure sensors 705 can provide the pressure inside the chamber 405, for example, for use in other calculations. The pressure sensors 705 can also be placed on the model 125 to locate stagnation points and other significant aerodynamic and physical locations. The pressure sensors 705 can also be used to measure the pressure differential between the high pressure chamber 555 and the low pressure chamber 560 for flow calculation purposes.

In some examples, the controller 700 can also comprise one or more velocity sensors 710. In some examples, because the windball can generate flows in many directions, the controller 700 can comprise at least three velocity sensors 710: a vertical velocity sensor, a longitudinal velocity sensor, and a transverse velocity sensor. In this manner, each vector component of the flow in the chamber can be measured with a velocity sensor 710 and then combined by the processor 735 to create a velocity vector with a velocity component and a direction component.

In other examples, the controller 700 can also comprise inputs from the fans 310 and/or flow control doors 410. So, for example, each fan motor can comprise a fan speed sensor or a current sensor, for example, to provide feedback to the processor 735 regarding current fan speeds. Similarly, the flow control doors 410 can comprise sensors 720, such as servo motors, linear actuators, or other actuators with position feedback to provide the current position of each flow control door 410. Using feedback from the velocity sensors 710 and the fan speed 715 and flow control door position sensors 720, therefore, can enable the processor 735 to monitor and adjust flow speed and direction, among other things.

In some examples, the model 125 or support 420 can include one or more strain gauges 725. The strain gauges 725 can be mounted between the model 125 and the support 420, for example, to measure lift, side force, and other aerodynamic and physical forces between the model 125 and the support 420. In other examples, strain gauges 725 can be provided on the model 125 to measure, for example, stress and flexion on the model 125 due to aerodynamic forces in the chamber 405.

In still other examples, the controller 700 can comprise position feedback sensors 730 for the gimbals 650. As with the flow control doors 410, the gimbals 650 can include servo motors, linear actuators, or other actuators with position feedback to provide the current position of each gimbal 650 to the processor 735. Using feedback from the velocity sensors 710 and the fan speed 715 and flow control door position sensors 720, for example, can enable the processor 735 to monitor and adjust flow position of the gimbals 650 to produce the desired flow speed and direction.

To this end, the processor 735 can also provide a number of outputs. In some examples, the processor 735 can provide fan speed commands 740 and/or flow control door position commands 745 to increase or decrease the speed of the flow or change the direction of the flow in the windball 300, 400, 500 based on, for example, inputs from the velocity sensors 710, the user, or simulation program. In other words, if the user commands a 30 mph flow at a 45 degree downward angle, for example, the controller 700 can command the fan speed 740 or door position 745 for those components necessary to produce that flow speed and direction. Similarly, the controller 700 can also command one or more gimbals to reposition 750 and one or more fans to increase or decrease in speed 740 to produce the desired flow speed and direction.

Embodiments of the present disclosure can also comprise a method 800 for using multi-directional airflows for more accurate flight simulation. In some embodiments, for example, the method 800 can comprise loading a flight profile into the controller 700 that simulates all or part of a flight for the vehicle being tested, as shown at 805. The flight controller can the run the simulation to test the vehicle in more realistic flight conditions, as shown at 810. This can be done using any of the systems 100, 300, 400, 500, 600 discussed above, for example, by activating and deactivating fans, opening and closing air flow control doors, moving gimbals, or combinations thereof (collectively, "air flow generators"). As mentioned above, the method 800 can enable the vehicle to be tested with changing air flows to simulate changing flight conditions, for example, but without unnecessarily redirecting the gravity vector by tilting the vehicle in the wind tunnel.

The simulation can include all or part of a projected flight. So, for example, the method 800 can simulate the lift required to carry a payload by increasing a substantially downward airflow in the test chamber, as shown at 815. With the payload added, the method 800 can then include simulating take-off by creating an additional downward draft in the test chamber, as shown at 820. The method 800 can then simulate the transition to forward flight, by slightly decreasing the downward flow and introducing a longitudinal flow, for example, as shown at 825.

During the flight, the method 800 can simulate additional flight conditions, as shown at 830. Additional flight conditions can include, for example and not limitation, cross winds by introducing a transverse flow, downdrafts and updrafts by introducing vertical flows, headwinds and tailwinds by introducing longitudinal flows, or combinations thereof. These can simulate environmental and other factors that can affect the vehicle during outdoor flights to, for example, deliver packages or take aerial photographs.

In some examples, the method 800 can also include simulating landing with the payload, as shown at 835. When simulating delivery of a package to a final destination and then returning to a central location, for example, the method 800 can simulate drop-off of the package by simply reducing the downward flow an appropriate amount, effectively "removing" the payload from the simulation, as shown at 845.

The simulation can then continue with an unloaded take-off, as shown at 820, and flight, as shown at 825 and 830, and an unloaded landing, as shown at 835. If, at this juncture, the payload is determined to have already been removed (in a previous flight segment), as shown at 840, the simulation can end. Of course, the simulation could continue for multiple pick-ups and drop-offs, multiple flight segments, with refueling/recharging stops, and other simulated conditions. In some embodiments, the test chamber can be in a climactic hangar, for example, to simulate outdoor conditions.

In this manner, an entire flight profile can simulate, for example, vertical takeoff, forward flight, change in directions, changing flight conditions, vertical landing, package drop-off, take-off, return flight, and combinations thereof. The method 800 can enable the accurate simulation of all, or part, of intended flight profiles to facilitate the development of, for example and not limitation, vehicle control systems, lift systems (e.g., propeller and motor designs), landing gear design, and package transportation. The method 800 can be used in concert with the controller 700 discussed above, an can include an instrument suite, for example, for measuring stress and strain on the vehicle chassis, motor load, battery drain, range, and control system reaction times. This can enable the development of flight controls, for example, without crashing vehicles or exposing them to harsh environments (e.g., electronics under development may not be fully housed on prototypes).

While several possible examples are disclosed above, examples of the present disclosure are not so limited. For instance, while a number of geometrical shapes have been disclosed for the test chambers (e.g., 305, 505), other shapes, including other polyhedrons, could be used. In addition, the location and configuration used for various features of examples of the present disclosure such as, for example, the location and number of fans, the type of fans (or other air flow generators), the supports, and the gimbals, for example, can be varied according to a particular UAV or facility design that requires a slight variation due to, for example, size or construction restraints, the type of UAV being tested, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method to simulate one or more flight segments for a vehicle in a multi-directional wind tunnel, the method comprising:
    loading a flight profile from a memory into a controller, wherein the controller is in communication with a plurality of air flow generators configured to generate a plurality of air flows in a plurality of directions; and
    running the flight profile on the controller to simulate the one or more flight segments and one or more flight conditions,
    wherein simulating the one or more flight segments and the one or more flight conditions comprises activating the plurality of air flow generators to affect an air flow around the vehicle.

2. The method of claim 1, wherein simulating the one or more flight segments comprises simulating a take-off flight segment of the vehicle by:
    activating one or more of the plurality of air flow generators to generate a downward component of the air flow.

3. The method of claim 1, wherein simulating the one or more flight segments comprises simulating a forward flight segment of the vehicle by:
    activating one or more of the plurality of air flow generators to generate a longitudinal component of the air flow and a downward component of the air flow.

4. The method of claim 1, wherein simulating the one or more flight segments comprises simulating a landing flight segment of the vehicle by:
    activating one or more of the plurality of air flow generators to generate a downward component of the air flow.

5. The method of claim 1, wherein simulating the one or more flight conditions comprises simulating a cross wind by:
    activating one or more of the plurality of air flow generators to generate a lateral transverse component of the air flow.

6. The method of claim 1, wherein simulating the one or more flight conditions comprises:
    simulating a head wind acting on the vehicle by activating one or more of the plurality of air flow generators to generate a first, longitudinal air flow in a first direction; and
    simulating a tail wind acting on the vehicle by activating one or more of the plurality of air flow generators to generate a second, longitudinal air flow in a second, direction opposite the first direction.

7. The method of claim 1, wherein activating the plurality of air flow generators to affect the air flow around the vehicle comprises:
    activating one or more pairs of fans, each pair of fans mounted on a gimbal, and
    rotating the gimbal to vary the direction of the air flow.

8. The method of claim 7, wherein rotating the gimbal to vary the direction of the air flow comprises moving a servo motor attached to the gimbal.

9. The method of claim 1, wherein the plurality of directions includes at least a vertical direction, a transverse direction, and a longitudinal direction.

10. The method of claim 1, wherein simulating the one or more flight segments comprises:
    simulating takeoff of the vehicle by causing the plurality of air flow generators to generate a downward component of the air flow; and
    simulating a transition from the takeoff to forward flight of the vehicle by causing the plurality of air flow generators to decrease the downward component of the air flow and causing the plurality of air flow generators to generate a longitudinal component of the air flow.

11. The method of claim 10, wherein simulating the one or more flight segments further comprises:
    simulating a drop-off of a payload carried by the vehicle by causing the plurality of air flow generators to decrease the downward component of the air flow by an amount corresponding to a lift that would be used to carry the payload.

12. A multi-directional wind tunnel, comprising:
    a support configured to hold a vehicle at a test position within the multi-directional wind tunnel;
    a plurality of air flow generators configured to generate a plurality of air flows in a plurality of directions;
    memory storing a flight profile that defines one or more flight segments and one or more flight conditions; and
    a controller connected to the plurality of air flow generators and the memory,
    wherein running the flight profile on the controller causes simulation of the one or more flight segments and the one or more flight conditions by activating one or more of the plurality of air flow generators to affect an air flow around the vehicle at the test position, and
    wherein a direction of the air flow is variable with respect to the vehicle at the test position, based on different combinations of the plurality of air flows as indicated by the flight profile.

13. The multi-directional wind tunnel of claim 12, wherein the plurality of directions includes at least a vertical direction, a longitudinal direction, and a transverse direction.

14. The multi-directional wind tunnel of claim 12, wherein the one or more flight segments of the flight profile includes:
   a first segment that simulates takeoff of the vehicle by generating a downward component of the air flow with the plurality of air flow generators; and
   a second segment that simulates a transition from the takeoff to forward flight of the vehicle by decreasing the downward component of the air flow generated by the plurality of air flow generators and generating a longitudinal component of the air flow with the plurality of air flow generators.

15. The multi-directional wind tunnel of claim 12, wherein the plurality of air flow generators are fans.

16. The multi-directional wind tunnel of claim 15, wherein the fans are mounted on movable gimbals.

17. The multi-directional wind tunnel of claim 12, wherein the plurality of air flow generators are air flow control doors mounted on facets of a polyhedral test chamber, the polyhedral test chamber positioned within a second chamber configured to cause unidirectional air flow from a first side of the second chamber to a second side of the second chamber.

18. A method comprising:
   mounting a vehicle in on a support of a multi-directional wind tunnel, the multi-directional wind tunnel comprising a plurality of air flow generators positioned to generate an air flow having at least one of a vertical air flow component, a transverse air flow component, and a longitudinal air flow component;
   loading a flight profile from a memory into a controller connected to the plurality of air flow generators, the flight profile defining a plurality of flight segments; and
   running the flight profile on the controller to simulate the plurality of flight segments on the vehicle by causing the plurality of air flow generators to generate the air flow in directions defined by the plurality of flight segments,
   wherein the plurality of flight segments includes at least a transition between a first flight segment and a second flight segment that define the directions of the air flow as different combinations of the at least one of the vertical air flow component, the transverse air flow component, and the longitudinal air flow component.

19. The method of claim 18, wherein the first flight segment simulates a takeoff of the vehicle by defining a direction of the directions with the vertical air flow component oriented downward, and the second flight segment simulates forward flight of the vehicle by reducing the vertical air flow component and adding the longitudinal air flow component.

20. The method of claim 19, wherein the plurality of flight segments further includes a third flight segment that simulates a drop-off of a payload carried by the vehicle by removing the longitudinal air flow component and further reducing the vertical air flow component by an amount corresponding to a lift that would be used to carry the payload.

\* \* \* \* \*